United States Statutory Invention Registration [19]

[11] Reg. Number: H376

Bremer

[43] Published: Dec. 1, 1987

[54] DEGRADATION MONITOR FOR LASER OPTICS

[75] Inventor: James C. Bremer, Gaithersburg, Md.

[73] Assignee: The United States of America as represented by the Secretary of the Army, Washington, D.C.

[21] Appl. No.: 784,902

[22] Filed: Oct. 7, 1985

[51] Int. Cl.[4] ..... G01N 21/32

[52] U.S. Cl. ..... 356/239; 356/237

[58] Field of Search ..... 356/237, 239, 335, 336; 250/227

[56] References Cited

U.S. PATENT DOCUMENTS 3,988,068 10/1976 Sprague ..... 356/239 X

FOREIGN PATENT DOCUMENTS 0161028 9/1984 Japan ..... 356/239

*Primary Examiner*—Stephen C. Buczinski
*Assistant Examiner*—Linda J. Wallace
*Attorney, Agent, or Firm*—Robert C. Sims; Freddie M. Bush; John C. Garvin, Jr.

[57] ABSTRACT

Refractive elements typically have ground glass edges in areas where the properly-transmitted laser beam does not impinge. Defects on either incident optical surface or the exit optical will produce wide-angle scattering. Some of this scattered radiation will impinge directly upon the ground glass; other scattered radiation will reach it after one or more internal reflections in the optical element: An optical fiber abutted to an edge transfers scattered light to a detector. If a threshold is exceeded, a visual or auditory signal may be generated to alert the operator and/or an interlock may be activated to disable the laser. One photodetector is used to detect returns from several elements. Fibers of different lengths are used to couple the different components into the detector. In this way, a pulsed laser with a pulse length short compared with the delay difference between fibers may be used to identify the individual element which contains the defect. The time taken between the laser pulse and a threshold exceedence can be used to identify the optical element which is the source of the stray light scattering. The surface of other optical elements, such as front-surfaced mirrors and stops, may also be monitored by locating the fiber off the main beam path at a point where stray light from the surface will be coupled into its numerical aperture.

6 Claims, 4 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DEGRADATION MONITOR FOR LASER OPTICS

DEDICATORY CLAUSE

The invention described herein was made in the course of or under a contract or subcontract thereunder with the Government and may be manufactured, used, and licensed by or for the Government for governmental purposes without the payment to me of any royalties thereon.

BACKGROUND OF THE INVENTION

The performance of optical elements may be degraded by a number of mechanisms, including the following:

(1) Contamination by deposition of films or particulates or by a condensation of liquids upon optical surfaces.

(2) Surface damage such as scratches produced by the impingement of high velocity particles or by detachment of optical coatings.

These problems are especially severe in optical systems which must handle high fluxes of radiation, such as laser optics. Defects of the types mentioned above interact with the laser beam and may absorb, scatter, or focus significant amounts of energy. One or more of the following deleterious effects may result.

(1) Off-boresight flux may be increased, creating an eye safety hazard.

(2) Opaque contaminants and scratches may be subject to severe local heating, leading to fracture of optical elements.

(3) Light may be focussed by transparent droplets, causing dielectric breakdown, localized heating, etc.

(4) Light may be backscattered into the system, causing damage to the laser or other components.

High energy lasers are being applied in military, aerospace, industrial, and medical environments where laboratory standards of cleanliness and temperature control cannot be maintained. If operation of laser systems continues after the optical path has been degraded, catastrophic failure can result.

The problem is, therefore:

(1) To detect the degradation of the optical train in real time and to disable the high-energy laser before catastrophic failure occurs.

(2) To identify, if possible, the individual optical assembly or element which must be cleaned or replaced, thereby minimizing the down-time of the system and facilitating its repair by technicians.

Any of the above-mentioned degradation mechanisms will probably lead to increased levels of stray light in the optical system. The subject invention is a stray light monitor which detects the laser flux impinging on points in the optical hardware which should not be illuminated in ideal operation. When this flux exceeds a pre-set threshold, the laser is disabled.

SUMMARY OF THE INVENTION

When a laser beam of high energy interacts with contaminants or defects on an optical surface, catastrophic failure can result. It is possible to prevent such failure by monitoring the stray light scattering in the system. The subject invention employs fiber optics coupled to edges of refractive elements to transfer stray light to a photodetector (optical fibers may also monitor mirrors or stops). A dedicated photo-detector may be used for each fiber or several fibers with variable time delay may be used to multiplex short-pulse returns from several fibers to a single detector.

DESCRIPTION OF THE BEST MODE AND PREFERRED EMBODIMENTS

Figure 1:
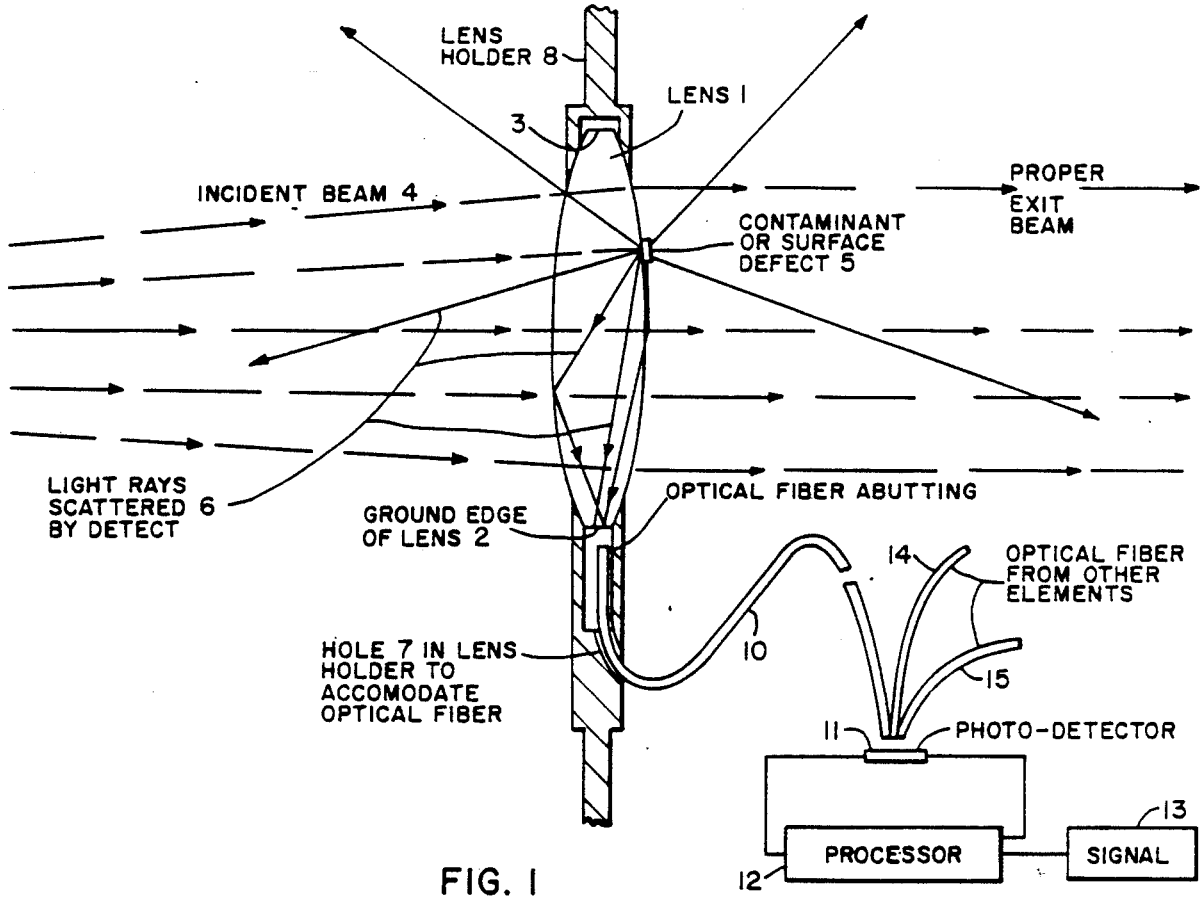
FIG. 1 shows the coupling of ground glass edges of refractive elements to a photodetector by optical fibers in accordance to the present invention.

It will generally be desirable to transfer the stray light from the optical train to a photodetector at a remote location. FIG. 1 illustrates a method for coupling stray light from refractive elements into optical fibers. This coupling technique may be applied to lenses, prisms, windows back surface mirrors, and any other devices in which the light is transmitted by a refractive material. Such refractive elements (such as lens 1) typically have ground glass edges 2 and 3 in areas where the properly-transmitted laser beam 4 does not impinge. Defects 5 on either incident optical surface or the exit optical surface will produce wide-angle scattering 6. Some of this scattered radiation will impinge directly upon the ground glass surface 2; other scattered radiation will reach surface 2 after one or more internal reflections in the optical element 1. An optical fiber 10 may be built into a hole 7 in lens holder 8 so that it abuts the ground surface 2 of the refractive element 1, as shown in FIG. 1. This optical fiber may then be used to transfer scattered light into a photodetector 11. The photodetector's output may then be amplified and compared to a threshold in processor 12. If this threshold is exceeded, a visual or auditory signal 13 may be generated to alert the operator and/or an interlock may be activated to disable the laser. Optical fibers 14 and 15 from other elements of the overall optical system also feed photodetector 11.

Figure 2:
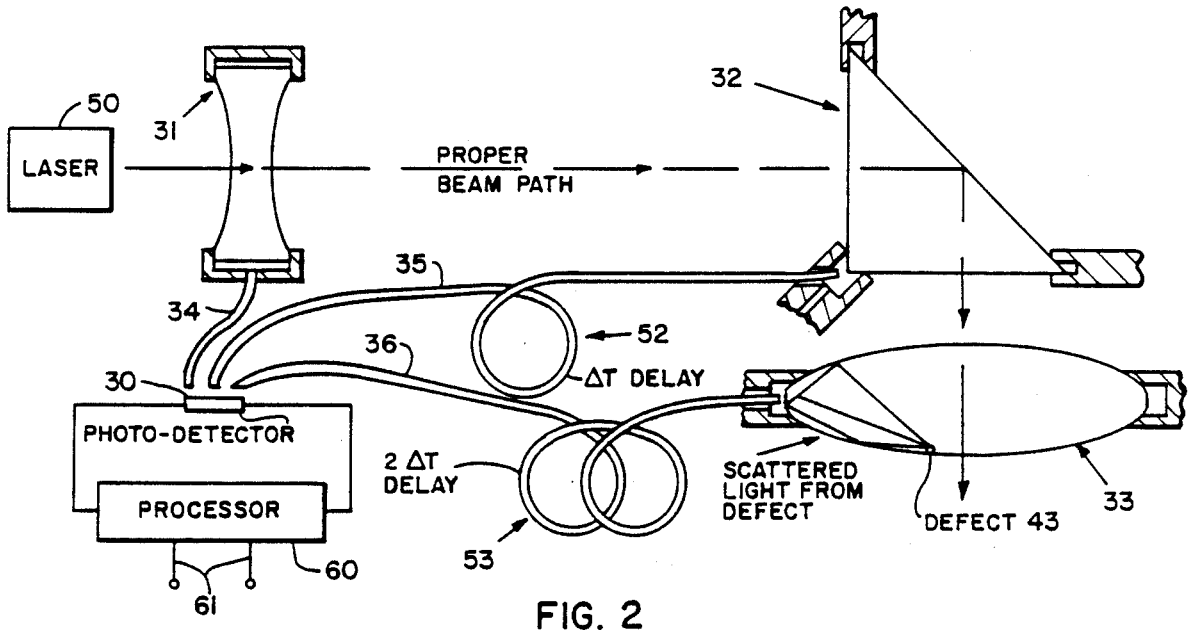
FIG. 2 illustrates the coupling of a plurality of elements in a optical system to a single photodetector.
Figure 3:
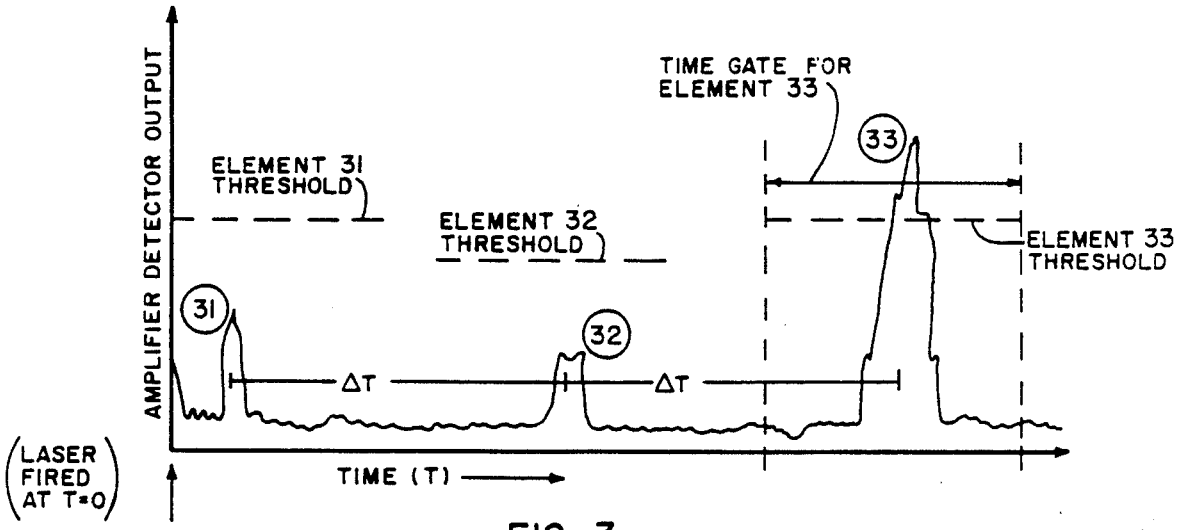
FIG. 3 is a time verses amplified detector output chart showing the operation of FIG. 2.

One photodetector 30 may be used to detect returns from several elements 31, 32 and 33, as illustrated in FIG. 2. If this configuration is used, it is advantageous to use fibers 34, 35 and 36 of different lengths to couple the different components into the detector 30. In this way, a pulsed laser with a pulse length short compared with the delay difference between fibers may be used to identify the individual elements 33 which contains the defect 43. This pulsed laser may be the high energy laser itself, if it is a short pulse device. If the system's high energy laser is CW or long-pulse, a diagnostic short-pulse laser 50 may be utilized. The time of flight between the laser pulse and the threshold exceedence can be used to identify the optical element which is the source of the stray light scattering (see FIG. 3). Because the element is identified, the amount of down-time required to correct the defect will be minimized. As shown in FIGS. 2 and 3, the lengths added to the optical fibers are such as to add multiples of a time delay $\Delta T$.

Figure 4:
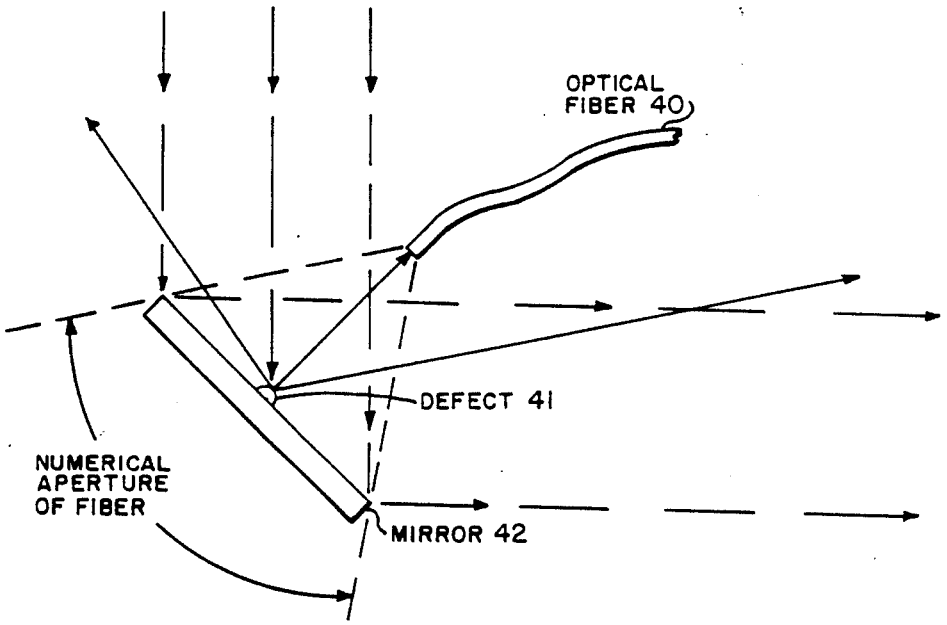
FIG. 4 illustrates scattering monitor for front-surface folding mirrors.

The surfaces of other optical elements, such as front-surfaced mirrors 42 and stops, may also be monitored. In this case, the fiber 40 (see FIG. 4) should be located off the main beam path at a point where stray light from the surface defect 41 will be coupled into its numerical aperture.

In operation of FIG. 2, a pulsed laser which may be the laser 50 of the original system or a diagnostic laser substituted for the laser 50. The time of firing of the laser is indicated in FIG. 3 and the outputs of the detector are separated by $\Delta T$ for each element of the system. As can be seen from FIG. 3 the spike output of photodetector 30 when the main laser beam passes through element 31 (plus delay time) is not sufficient to exceed threshold value. Same is true for element 32 which does not contain substantial defects. The separation of the spikes in FIG. 1 are due mainly to the length of the paths of the fiber optic 34, 35 and 36. Fiber optics 35 having a delay loop 52 and fiber optics 36 having a delay loop 53. Element 33 having a substantial defect 43 causes the output of the detector 30 after the delay caused by delay loop 53 to exceed the threshold value for this particlar element in the system. This gives a output 61 from processor 60 which will indicate exactly which element has the defect. This output can be used to shut the system down or give a signal out to indicate a defect is in existence.

I claim:

1. A system for detecting degradation of an optical element comprising an optical detector for detecting optical emission in an area of said optical element where optical emissions are normally not present except under conditions of degradation of the optical element, and first coupling means coupling optical emissions from said area to said optical detector.

2. A system as set forth in claim 1 wherein said optical element has ground edges and said first coupling means couples the emission from at least one of the edges to said optical detector.

3. A system as set forth in claim 2 wherein said first coupling means is a fiber optics device which has one end that abuts one of said ground edges.

4. A system as set forth in claim 1 wherein a plurality of optical elements are present each having an area normally not emitting optical signals, and a plurality of coupling means coupling optical emissions from each of these areas to said optical detector.

5. A system as set forth in claim 4 wherein said plurality of coupling means are of different predetermined lengths such that upon the emission of a pulse of electromagnetic energy through the optical elements, the time the optical emissions from said areas are transmitted to said optical detector are each spaced apart a predetermined amount of time whereby a particular emission being received by said optical detector can be identified as to which optical element it originated from.

6. A system as set forth in claim 5 wherein said coupling means are fiber optics.

* * * * *